(12) United States Patent
Pilgram et al.

(10) Patent No.: US 7,907,965 B2
(45) Date of Patent: Mar. 15, 2011

(54) APPARATUS AND METHOD FOR CONTROLLING THE POWER CONSUMPTION OF A COMBINED UMTS/GSM/EDGE RADIO STATION

(75) Inventors: Berndt Pilgram, München (DE); Dietmar Wenzel, München (DE)

(73) Assignee: Infineon Technologies AG, Neubiberg (DE)

( * ) Notice: Subject to any disclaimer, the term of this patent is extended or adjusted under 35 U.S.C. 154(b) by 823 days.

(21) Appl. No.: 11/222,324

(22) Filed: Sep. 8, 2005

(65) Prior Publication Data

US 2006/0079297 A1    Apr. 13, 2006

Related U.S. Application Data

(63) Continuation of application No. PCT/DE2004/000339, filed on Feb. 24, 2004.

(30) Foreign Application Priority Data

Mar. 12, 2003  (DE) .................................. 103 10 771

(51) Int. Cl.
| | |
|---|---|
| *H04M 1/00* | (2006.01) |
| *H04B 7/185* | (2006.01) |
| *H04B 1/04* | (2006.01) |
| *H04B 1/16* | (2006.01) |
| *H04B 1/00* | (2006.01) |
| *H01Q 11/12* | (2006.01) |
| *G08C 17/00* | (2006.01) |
| *H04L 27/08* | (2006.01) |
| *G06F 1/26* | (2006.01) |
| *G06F 1/32* | (2006.01) |
| *G06F 1/00* | (2006.01) |
| *G06F 11/30* | (2006.01) |

(52) U.S. Cl. .................. 455/552.1; 455/13.4; 455/127.1; 455/343.1; 370/311; 370/318; 375/130; 375/345; 713/320; 713/323; 713/340

(58) Field of Classification Search .................. 455/572, 455/574, 127.5, 342.1–343.6, 13.4, 69, 70, 455/84, 125, 126, 127.1, 127.2, 134, 136, 455/137, 138, 404.1, 404.2, 405, 418, 419, 455/420, 442, 447, 452.1, 452.2, 455, 456.1, 455/456.2, 515, 522, 127.4, 553; 375/130, 375/345, 356; 370/278, 203, 204, 208, 229, 370/230, 280, 318, 320, 328, 331, 332, 334, 370/335, 336, 337, 342, 348, 311; 342/174, 342/357.06, 387, 442, 457, 465; 713/320, 713/321, 322, 323, 324, 330, 340
See application file for complete search history.

(56) References Cited

U.S. PATENT DOCUMENTS 6,993,669 B2 *  1/2006  Sherburne, Jr. ............... 713/322
(Continued)

FOREIGN PATENT DOCUMENTS

DE    100 09 683 A1    8/2001
(Continued)

OTHER PUBLICATIONS

International Search Report, Int'l. Application No. PCT/DE2004/000339, Int'l. Filing Date Feb. 24, 2004, 2 pgs.

*Primary Examiner* — Nay Maung
*Assistant Examiner* — Paul P Tran
(74) *Attorney, Agent, or Firm* — Eschweiler & Associates, LLC

(57) ABSTRACT

A mobile station has an apparatus by means of which the power consumption of the mobile station is controlled. The apparatus has a monitoring unit which is connected to the at least two radio systems in the mobile station. During activity pauses in the mobile station, whose time duration and whose start and end times are monitored by the monitoring unit, radio system units which are not required, and possibly further units in the mobile station, are deactivated or are switched to a state with reduced power consumption.

24 Claims, 1 Drawing Sheet

U.S. PATENT DOCUMENTS

| | | | |
|---|---|---|---|
| 7,242,972 B2 * | 7/2007 | Harris | 455/574 |
| 2003/0040292 A1 * | 2/2003 | Peterzell et al. | 455/147 |
| 2003/0119503 A1 * | 6/2003 | Shohara et al. | 455/434 |
| 2003/0157909 A1 * | 8/2003 | Atkinson et al. | 455/130 |
| 2003/0214916 A1 * | 11/2003 | Khawand et al. | 370/278 |
| 2004/0029621 A1 * | 2/2004 | Karaoguz et al. | 455/574 |
| 2005/0042996 A1 * | 2/2005 | Khlat et al. | 455/255 |

FOREIGN PATENT DOCUMENTS

| | | |
|---|---|---|
| EP | 1 213 830 A1 | 6/2002 |
| EP | 1 261 142 A1 | 11/2002 |
| EP | 1 313 220 A1 | 5/2003 |
| JP | 10-145467 A | 5/1998 |
| JP | 2002-009688 A | 1/2002 |
| JP | 2003-502900 T | 1/2003 |

* cited by examiner

APPARATUS AND METHOD FOR CONTROLLING THE POWER CONSUMPTION OF A COMBINED UMTS/GSM/EDGE RADIO STATION

REFERENCE TO RELATED APPLICATIONS

This application is a continuation of PCT/DE2004/000339, filed on Feb. 24, 2004, which was not published in English, which claims the benefit of the priority date of German Patent Application No. DE 103 10 771.1, filed on Mar. 12, 2003, the contents of which both are herein incorporated by reference in their entireties.

FIELD OF THE INVENTION

The invention relates to an apparatus for controlling the power consumption of a radio station, in particular of a mobile radio station, the radio station being designed to transmit/receive signals to these at least two radio standards with different time patterns. The invention also relates to a method for controlling the power consumption of a radio station.

BACKGROUND OF THE INVENTION

A large number of actions have to be initiated and control signals produced in transmitting and receiving devices in mobile stations, the timings of which actions and control signals are correlated with a special pattern, which is specific for a mobile radio standard.

In recent years, a range of different standards have become established in the mobile radio field, which are being developed further or will be replaced by new standards in the future. Known examples of mobile radio standards are GSM (Global System for Mobile Communication), the 8 PSK (8-Phase Shift Keying) further development of GSM which is referred to as the EDGE (Enhanced Data Services for GSM Evolution) standard, as well as various standards based on the CDMA (Code Division Multiple Access) transmission method, such as UMTS (Universal Mobile Telecommunication System). A fourth-generation mobile radio standard is currently already being developed as MBS (Mobile Broad Band System).

The existence of different and competing standards has resulted in an increase in the requirements for mobile stations for mobile radio. Mobile stations are desirable which can support a plurality of mobile radio systems and standards at the same time. This is dependent on the mobile station being able to produce the various time patterns of the individual standards and being able to carry out suitable event control processes on this basis.

The transmission methods, such as CDMA and TDMA, for these two different mobile radio standards are based on different symbol clock frequencies, with the transmitted data normally being structured in transmission frames which each have a predetermined length. This structure and/or length of each transmission frame in a continuous signal sequence is predetermined and is identified by the mobile station. The mobile station has to align its time sequence control with this structure. Within this frame structure, there are often time periods in which no activities take place in the mobile station. Particularly in the times in which the mobile station is waiting for incoming calls, in the so-called paging mode, there are relatively long activity pauses in which the power consumption of the mobile station should be reduced to a minimum in order to achieve as long a standby time as possible with a power supply capacity that is as long as possible. It should thus be possible to stop or entirely switch off specific functional blocks within these activity pauses.

A prior art is known from German Laid-Open Specification DE 100 09 683 A1 in which as many units as possible, such as radio-frequency oscillators, counters or frequency dividers, are deactivated during activity pauses in order to reduce the power consumption in a mobile station which supports the GSM radio standard. During an activity pause, the time of the next activation of the mobile station is maintained by an audio-frequency oscillator. Furthermore, in response to an interrupt request which occurs during such an activity pause, the time period remaining to the next activation of the system is reduced in such a way that the reduced remaining time period is sufficient to prepare for the activation. In consequence, the standby state time is reduced in response to an interrupt request without losing the synchronization between the communication unit and its base station or main station in the process. The known method and the known mobile station have the disadvantage that only one radio standard is supported. The operation of a mobile station which supports a plurality of radio standards and in which the units of this mobile station which are associated with the different radio standards are deactivated in activity pauses cannot be achieved with the method and the mobile station which are known from the prior art.

SUMMARY OF THE INVENTION

The following presents a simplified summary in order to provide a basic understanding of one or more aspects of the invention. This summary is not an extensive overview of the invention, and is neither intended to identify key or critical elements of the invention, nor to delineate the scope thereof. Rather, the primary purpose of the summary is to present some concepts of the invention in a simplified form as a prelude to the more detailed description that is presented later.

The present invention provides an apparatus and a method in which the power consumption of a radio station which supports at least two radio standards can be reduced.

In accordance with an aspect of the present invention, an apparatus for controlling the power consumption of a radio station has at least two radio systems. Each of the radio systems is designed to support a respective radio standard, with the radio standards being different. The radio station, which in particular is in the form of a mobile station, is designed to transmit/receive signals to these different radio standards with different time patterns. Furthermore, the apparatus according to the invention has a first frequency generating unit and a monitoring unit, with the monitoring unit being electrically connected to the first frequency generating unit, in particular being connected downstream from this first frequency generating unit. The first frequency generating unit is, in particular, in the form of an audio-frequency oscillator. Furthermore, the monitoring unit is electrically connected to each radio system in the radio station in order to control the power consumption.

The apparatus makes it possible to produce a radio station which supports at least two different radio standards and in which the system-relevant units of each radio system as well as further units in the radio station are produced with the respectively required power consumption depending on their requirement profile and on the required operating state. This makes it possible to achieve a considerable reduction in the power consumption of the radio station, thus making it possible to increase the standby time of the radio station considerably. Since only a single monitoring unit is responsible for all the radio systems, it is also possible to minimize or reduce the circuitry complexity, thus allowing a simple implementation. In addition, this makes it possible to produce a compact and relatively small apparatus as is desirable and advantageous in particular and in addition with respect to the provision of a radio station which is as small as possible overall. The apparatus according to the invention makes it possible, in particular, to minimize or reduce the power consumption of the radio station in activity pauses.

In particular in order to control the radio station during activity pauses, each radio system can have a separate time control unit, with each time control unit being electrically connected to the monitoring unit via dedicated synchronization lines, in particular via a single synchronization line in each case, in which case, in particular, the synchronization line is bidirectional.

Each radio system can have a clock signal generator. The monitoring unit is electrically connected to only one of the clock signal generators via a second signal line, which is formed between the monitoring unit and the clock signal generator for the corresponding radio system.

In one exemplary aspect, the apparatus furthermore has a processor unit, a power supply unit and a second frequency generating unit. The monitoring unit is electrically connected to the processor unit, to the power supply unit and to the second frequency generating unit, which can be in the form of a radio-frequency oscillator, via a separate signal line in each case. The monitoring unit can be used to control the operating states that can be assumed by the processor unit, the power supply unit and the second frequency generating unit, with the various operating states being characterized by different power consumption. It is thus possible, in addition to the units which are directly associated with the respective radio systems, to also deactivate further units in the radio station during an activity pause, or to operate them with a reduced power consumption, thus once again making it possible to reduce the power consumption of the radio station.

In another aspect, the monitoring unit is electrically connected to the processor unit by means of two signal lines. In this case, the first signal line can be used to transmit signals by means of which it is possible to program the time period of the activity pauses, whose start and duration in particular are matched to the different time patterns of the mobile radio systems, in a radio station. It is also possible to provide for the capability to transmit signals for reprogramming a radio system via the second signal line between the monitoring unit and the processor unit. In particular, reprogramming can be carried out during the start and/or end time of the activity pause in the radio station.

Yet another aspect of the invention is characterized in that the processor unit is electrically connected via a signal line to each radio system, in particular to each clock signal generator in the respective radio system.

The start and/or end times of the operating states at which the power consumption of the radio station is changed and/or the time periods of the operating states with a changed power consumption can be initiated in a one manner by the monitoring unit.

The radio systems can support the UMTS, GSM and GSM/EDGE radio standards.

In a method according to the invention for controlling the power consumption of a radio station, in particular of a mobile radio station, having at least two radio systems, with the radio systems each supporting one radio standard and the radio station being designed to transmit/receive signals of these at least two radio standards with different time patterns, switching in the radio station is carried out by units in the radio station to operating states which are characterized by different power consumption in activity pauses, which are matched in particular to the start and duration of the different time patterns in such a way that the activity pauses are measured in the respective time units.

The method according to the invention makes it possible to minimize or reduce the power consumption of a radio station and, in particular in activity pauses, to achieve a considerable reduction in the power consumption of the radio station, thus making it possible to considerably increase the standby time of the radio station. The method can be carried out in a simple manner, and with little complexity.

The time period and the start and/or end time of the activity pause are/is monitored by means of a monitoring unit. The switching of the operating states of the units in the radio station is can be carried out and/or supported by means of the monitoring unit. In one advantageous embodiment, the time control unit which is associated with one radio system is deactivated or is switched to a reduced power consumption state. It is advantageous that, during an activity pause in which the clock signal of a radio-frequency oscillator is deactivated, the time period to the end of this activity pause is determined by means of a clock signal from an audio-frequency oscillator.

The time duration of an activity pause is, for example, programmed into the monitoring unit by means of a signal from a processor unit. It is possible to provide for the processor unit to produce a second signal, which is transmitted to a clock signal generator for the respective radio system. This second signal is used to program the initiation of a trigger signal for a start time of an activity pause by a time control unit for the associated radio system in the clock signal generator for this radio system. The trigger signal for the time control unit of a radio system can be transmitted to the monitoring unit. Once the monitoring unit has received the trigger signal, a switching-off signal can be sent from the monitoring unit to that time control unit from which the trigger signal is sent prior to this.

In another exemplary aspect of the method according to the invention, in the event of switching off or switching to a state with reduced power consumption of a second frequency generating unit, in particular the radio-frequency oscillator and/or of a power supply unit in the radio station during the activity pause, the second frequency generating unit, in particular the radio-frequency oscillator and/or the power supply unit are activated again before the end of the activity pause.

A subtraction time can be determined by which the remaining time period until the end of the activity pause is reduced for activation of the radio-frequency oscillator and/or of the power supply unit. Generally, the subtraction time lasts until a stable clock signal and/or a stable power supply are/is achieved or produced at the end of the activity pause, within the subtraction time interval.

It is possible to provide that the transmission of a signal from a monitoring unit to a processor unit at the start and/or end of an activity pause, means that reprogramming of a radio system is initiated, in particular a change to procedure whose changing does not require an exactly predetermined time, in particular a change to clock division factors and/or switching on or off, or a change to a voltage supply.

DETAILED DESCRIPTION OF THE INVENTION

Figure 1:
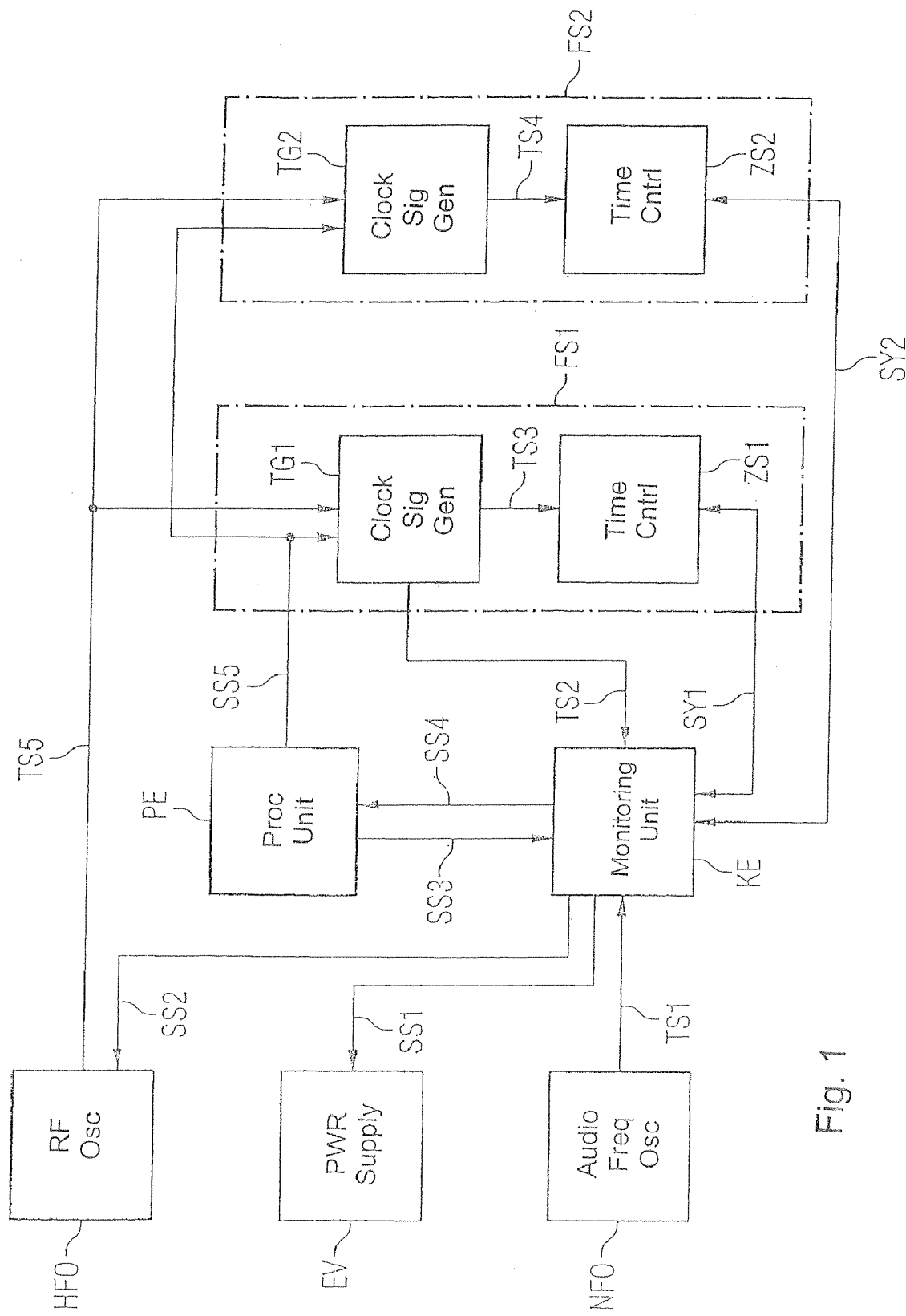
FIG. 1 is a block diagram of an apparatus for a mobile radio station in accordance with an aspect of the present invention.

One or more implementations of the present invention will now be described with reference to the attached drawings, wherein like reference numerals are used to refer to like elements throughout, and wherein the illustrated structures are not necessarily drawn to scale.

Transmission methods, such as CDMA and TDMA, for different mobile radio standards are based on different symbol clock frequencies, with the transmitted data normally being structured in transmission frames which each have a predetermined length. This structure and/or length of each transmission frame is in a continuous signal sequence is predetermined and is identified by the mobile station. A mobile station has to align its time sequence control with this structure. Within this frame structure, there are time periods in which no activities take place in the mobile station. Particularly in the times in which the mobile station is waiting for incoming calls, in the so-called paging mode, there are relatively long activity pauses in which the power consumption of the mobile station should be reduced to a minimum in order to achieve as long a standby time as possible with a power supply capacity that is as long as possible. The present invention operates one or more components of the mobile station in a reduced power consumption mode during these activity pauses.

FIG. 1 is a block diagram illustrating an apparatus according to the invention arranged in a mobile radio station. The apparatus has two radio systems FS1 and FS2, with the first radio system FS1 in the exemplary embodiment supporting the UMTS mobile radio standard, and the second radio system FS2 supporting the GSM/EDGE mobile radio standard. The first radio system FS1 has a clock signal generator TG1 and a time control unit ZS1. The second radio system FS2 analogously has a clock signal generator TG2 and a time control unit ZS2. The mobile station may have further radio systems which support additional radio standards other than the UMTS and GSM/EDGE standards.

Furthermore, the apparatus has a monitoring unit KE, which is used to monitor activity pauses in the mobile station. The monitoring unit KE is electrically connected to the first radio system FS1 and to the second radio system FS2. The clock signal generator TG1 for the first radio system FS1 is connected to the monitoring unit KE via a clock signal line TS2. A second electrical connection between the monitoring unit KE and the first radio system FS1 is provided by a bidirectional synchronization line SY1 between the time control unit ZS1 and the monitoring unit KE. The time control unit ZS2 for the second radio system FS2 is likewise electrically connected to the monitoring unit KE via a bidirectional synchronization line SY2. Both the synchronization line SY1 and the synchronization line SY2 may each be in the form of a double line (differential line).

Furthermore, the clock signal generator TG1 in the first radio system FS1 is electrically connected to the time control unit ZS1 via a clock signal line TS3, and the clock signal generator TG2 in the second radio system FS2 is electrically connected to the time control unit ZS2 via a clock signal line TS4.

The monitoring unit KE is electrically connected to a first frequency generating unit (which in the exemplary embodiment is in the form of an audio-frequency oscillator NFO) via a clock signal line TS1. The monitoring unit KE is furthermore electrically connected to a power supply unit EV via a first control signal line SS1, and is electrically connected to a second frequency generating unit (which is in the form of a radio-frequency oscillator HFO in the exemplary embodiment) via a second control signal line SS2. In addition, the monitoring unit KE is electrically connected to a processor unit PE via two control signal lines SS3 and SS4. The processor unit PE is also electrically connected to the radio systems FS1 and FS2, in particular to the clock signal generators TG1 and TG2, via a control signal line SS5. Furthermore, the radio-frequency oscillator HFO is electrically connected to the two radio systems FS1 and FS2, in particular to the clock signal generators TG1 and TG2, via a clock signal line TS5.

One procedure for a control process for the power consumption of the mobile station and its system units will be explained in the following text. In the exemplary embodiment, the radio-frequency oscillator HFO, the power supply unit EV, the audio-frequency oscillator NFO and the monitoring unit KE are in an active state, which is referred to as the operating state and whose power consumption is relatively high in comparison to that in a standby mode or the deactivated state. The processor unit PE in the exemplary embodiment programs the clock signal generator TG1 for the first radio system FS1 via the control signal line SS5, with this clock signal generator TG1 producing a clock signal for the time control unit ZS1 via the clock signal line TS3. The time control unit ZS1 is in an active operating state with a relatively high power consumption.

The processor unit PE is likewise used to program an event in the time control unit ZS1 via the control signal line SS5. In the time control unit ZS1, the event results in a trigger signal being initiated at the start time of an activity pause in the mobile station. Furthermore, the processor unit PE programs the time duration of the activity pause in the monitoring unit KE, via the control signal line SS3.

The trigger signal is initiated in the time control unit ZS1 at the start time of the activity pause, and is transmitted to the monitoring unit KE via the synchronization line SY1. At the same time, the signal input of the synchronization line SY1 of the time control unit ZS1 is switched from transmit to receive. Immediately after this, the monitoring unit KE sends a switching-off signal to the time control unit ZS1, by which means the clock signal for the time control unit ZS1 is switched off. The time control unit ZS1 is switched to an operating state in which the power consumption is less than that in the active state. It is also possible to provide for the time control unit ZS1 to be completely deactivated.

After the time at which the time control unit ZS1 is switched to an operating state with reduced power consumption and the clock signal for the time control unit ZS1 is switched off, the remaining time period of the activity pause until the time at which it ends is measured by means of the clock signal from the audio-frequency oscillator NFO, with the clock signal being transmitted via the clock signal line TS1.

If the radio-frequency oscillator HFO and/or the power supply unit EV are/is not required by the second radio system FS2 either, then the two units HFO and/or EV are switched off by appropriate control signals via the control signal lines SS1 and SS2, or are switched to a reduced power consumption operating state, a standby state.

The fact that the remaining time period until the end of the activity pause is determined in an advantageous manner means that it is possible to define a subtraction time by which the remaining time period of the activity pause is shortened in order to once again activate the switched-off units HFO and/or EV in good time before the time at which the activity pause ends. The radio-frequency oscillator HFO and/or the power supply unit EV are/is activated by means of appropriate control signals by the monitoring unit KE via the respective control signal lines SS1 and SS2. The subtraction time is defined in such a way that a stable clock signal can be produced via the clock signal line TS5 and a stable voltage supply can be produced for the power supply unit EV before the time at which the activity pause ends.

If the activity pause is not an integer multiple of the period duration of the clock signal from the audio-frequency oscillator NFO, the clock signal from the clock signal generator TG1 is produced via the clock signal line TS2 at the end of the time interval of the subtraction time, and before the time at which the activity pause ends. The non-integer remainder of the time duration of the activity pause can thus be measured. At the time at which the activity pause ends, the monitoring unit KE sends a start signal via the synchronization line SY1 to the time control unit ZS1. From this time on, the time control unit ZS1 is activated again, and continues to run with the clock signal from the clock signal generator TG1. The input of the synchronization line SY1 of the time control unit ZS1 is switched to the output.

The control signal line SS4 between the monitoring unit KE and the processor unit PE allows the monitoring unit KE to reprogram the radio system FS1 at the start and/or end time of an activity pause. In particular, this allows processes to be carried out which need not be carried out at a precisely predetermined time or for which an interrupt delay time is permissible, provided that a clock signal is present at the processor unit PE. For example, it is possible to change clock division factors or to switch voltage supplies on or off, or to change them.

The monitoring unit KE and the audio-frequency oscillator NFO are also supplied with voltage during the activity pauses. In an analogous manner, the second radio system FS2 and/or functional units in the second radio system FS2 can be switched off or can be switched to a reduced power consumption state, instead of or in addition to the first radio system FS1.

One connection between a single clock signal generator (in the exemplary embodiment the clock signal generator TG1) for one radio system FS1 or FS2 and the monitoring unit KE is sufficient for determining the non-integer remainder of the time duration of the activity pause. This single clock signal generator can be used for all time control tasks which require finer time resolution than that which is allowed by the clock signal from the audio-frequency oscillator NFO. One audio-frequency clock and one radio-frequency clock are thus sufficient to control all the activity pauses for the radio systems in the radio station.

The apparatus according to the invention and the method according to the invention make it possible to minimize or reduce the power consumption of a mobile station which supports at least two different radio standards and, in particular during activity pauses in the mobile station, to deactivate as many system units as possible in the mobile station—units in the radio systems and possibly further units in the mobile station—, or to switch them to a reduced power consumption state. This makes it possible to considerably increase the standby time of the mobile station. Only a single monitoring unit is used to monitor the power consumption of all the radio systems in the mobile station and their units. This monitoring unit manages the common resources and provides these resources with the required power as a function of the respectively required demand profile. This makes it possible to operate a minimum number of functional units in the mobile station during activity pauses in the active state. The electrical connection between the monitoring unit and the radio systems, in particular the time control units for the radio systems, can be provided by in each case only one synchronization line, thus making it possible to reduce connections and wiring complexity, and thus also making it possible to considerably reduce the circuitry complexity.

While the invention has been illustrated and described with respect to one or more implementations, alterations and/or modifications may be made to the illustrated examples without departing from the spirit and scope of the appended claims. In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising".

What is claimed is:

1. An apparatus for controlling power consumption of a radio station, comprising:
    a plurality of radio systems, each supporting a distinct radio standard, wherein a first radio system of the plurality of radio systems comprises a time control unit and a clock signal generator, wherein the clock signal generator provides a clock signal to the time control unit;
    a first frequency generating unit comprising an audio-frequency oscillator; and
    a monitoring unit electrically connected to the first frequency generating unit, to the plurality of radio systems, to the clock signal generator and to the time control unit of the first radio system, wherein the monitoring unit is configured to control power consumption of the time control unit of the first radio system by switching the time control unit to a different operating state during an activation pause;
    wherein the monitoring unit is configured to determine a remaining time of an activation pause using a clock signal provided by the audio-frequency oscillator, and is configured to receive a remainder of the remaining time of the activation pause from the clock signal generator of the first radio system, the remainder comprising a non-integer multiple of a period of the audio-frequency oscillator.

2. The apparatus of claim 1, wherein the clock signal generator is electrically connected to the monitoring unit via a second signal line.

3. The apparatus of claim 1, further comprising:
    a processor unit;
    a power supply unit;
    a second frequency generating unit; and
    wherein operating states of the processor unit, of the power supply unit, and of the second frequency generating unit are characterized by different power consumption and the operating states are controlled by the monitoring unit.

4. The apparatus of claim 3, further comprising a first signal line electrically connected between the monitoring unit and the processor unit and a second signal line electrically connected between the monitoring unit and the processor unit, wherein first signals matching time patterns of the plurality of radio systems are transmitted via the first signal line and second signals for reprogramming the plurality of radio systems are transmitted via the second signal line.

5. The apparatus of claim 3, further comprising a signal line connected to respective clock signal generators within the plurality of radio systems.

6. The apparatus of claim 3, wherein the monitoring unit controls starting and ending times of the operating states according to selected power consumption.

7. The apparatus of claim 1, wherein the supported radio standards are selected from a group comprising UMTS, GSM and GSM/EDGE standards.

8. The apparatus of claim 1, wherein
the plurality of radio systems, each comprising a clock signal generator and a time control unit which generates trigger signals at starting times of activation pauses;
wherein the monitoring unit generates switch off signals in response to the trigger signals and generates switch on signals after a duration of the activation pauses.

9. The apparatus of claim 8, wherein the time control units of the plurality of radio systems enter a reduced power state in response to the switch off signals.

10. The apparatus of claim 8, wherein the time control units of the plurality of radio systems enter an active operating state in response to the switch on signals.

11. A method for controlling power consumption of a radio station, comprising:
providing a plurality of radio systems each supporting a distinct radio standard;
transmitting and receiving signals for the plurality of radio systems according to the distinct radio standards and varied time patterns;
detecting activity pauses for the plurality of radio systems during the transmitting and receiving signals;
switching to low power operating states during the detected activity pauses;
wherein detecting the activity pauses further comprises detecting a start time, end time, and duration for the activity pauses, and wherein detecting the duration for the activity pauses comprises measuring the duration for the activity pauses in time units of the respective varied time patterns of the distinct radio standards;
using a clock signal provided by an audio-frequency oscillator to detect a remaining time of an activity pause, and
receiving a remainder of the remaining time of the activity pause from a clock signal generator in a first radio system of the plurality of radio systems, the remainder comprising a non-integer multiple of a period of the audio-frequency oscillator.

12. The method of claim 11, wherein switching to low power operating states comprises deactivating time control units of the radio systems.

13. The method of claim 11, wherein switching to low power operating states comprises causing time control units of the radio systems to enter a standby mode with reduced power consumption.

14. The method of claim 13, wherein switching to low power operating states further comprises deactivating a second frequency generating unit until an end of the detected activity pauses as determined by a clock signal from an audio frequency oscillator.

15. The method of claim 11, further comprising programming durations of the activity pauses into a monitoring unit.

16. The method of claim 15, wherein transmitting and receiving signals for the plurality of radio systems further comprises generating trigger signals by time control units of the radio systems upon initiation of the activity pauses.

17. The method of claim 16, further comprising generating switch off signals in response to the generated trigger signals.

18. The method of claim 11, wherein the duration of the activity pauses is measured by an audio-frequency oscillator and a clock signal generator of one of the plurality of radio systems, wherein the clock signal generator provides a clock signal with a finer time resolution than that which is allowed by the clock signal from the audio-frequency oscillator.

19. The method of claim 11, wherein a first radio system of the plurality of radio systems comprises a time control unit and a clock signal generator, wherein the clock signal generator provides a clock signal to the time control unit.

20. The method of claim 11, further comprising:
using the clock signal provided by an audio-frequency oscillator to detect a duration of an activity pause.

21. A method for controlling power consumption of a radio station, comprising:
providing a plurality of radio systems each supporting a distinct radio standard;
transmitting and receiving signals for the plurality of radio systems according to the distinct radio standards and varied time patterns;
detecting activity pauses for the plurality of radio systems during the transmitting and receiving signals;
switching the plurality of radio systems and a radio-frequency oscillator to low power operating states during the detected activity pauses, wherein the radio frequency oscillator provides a radio frequency clock signal to each of the plurality of radio systems;
switching the radio-frequency oscillator or the power supply unit, or both to active operating states prior to an end of the detected activity pauses;
using a clock signal provided by an audio-frequency oscillator to detect a remaining time of an activity pause, and
receiving a remainder of the remaining time of the activity pause from a clock signal generator in a first radio system of the plurality of radio systems, the remainder comprising a non-integer multiple of a period of the audio-frequency oscillator.

22. The method of claim 21, wherein an end of an activity pause is determined using an audio-frequency oscillator and a clock signal generator of one of the plurality of radio systems, wherein the clock signal generator provides a clock signal with a finer time resolution than that which is allowed by the clock signal from the audio-frequency oscillator.

23. The method of claim 21, wherein a first radio system of the plurality of radio systems comprises a time control unit and a clock signal generator, wherein the clock signal generator provides a clock signal to the time control unit.

24. The method of claim 21, further comprising:
using the clock signal provided by an audio-frequency oscillator to detect a duration of an activity pause.

* * * * *